US011159392B2

(12) United States Patent
Cherumbath (10) Patent No.: US 11,159,392 B2
(45) Date of Patent: Oct. 26, 2021

(54) MANAGING SERVICE DEPLOYMENT

(71) Applicant: Capital One Services, LLC, McLean, VA (US)

(72) Inventor: Sreekumar Cherumbath, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/948,800

(22) Filed: Oct. 1, 2020

(65) Prior Publication Data

US 2021/0021489 A1    Jan. 21, 2021

Related U.S. Application Data

(63) Continuation of application No. 16/406,259, filed on May 8, 2019, now Pat. No. 10,797,967, which is a (Continued)

(51) Int. Cl.
*H04L 12/24* (2006.01)
*G06F 21/31* (2013.01)
(Continued)

(52) U.S. Cl.
CPC ............ *H04L 41/5048* (2013.01); *G06F 8/60* (2013.01); *G06F 9/45558* (2013.01);
(Continued)

(58) Field of Classification Search
CPC ... H04L 41/5048; H04L 63/102; H04L 67/16; H04L 67/34; H04L 41/0843;
(Continued)

(56) References Cited

U.S. PATENT DOCUMENTS 6,378,128 B1    4/2002    Edelstein et al.
6,473,794 B1    10/2002    Guheen et al.
(Continued)

OTHER PUBLICATIONS

Airashed'et al, "Optimal Deployment of Actors using Simulated Annealing within WSAN", IEEE, pp. 715-721 (Year: 2009).*
(Continued)

*Primary Examiner* — Anil Khatri
(74) *Attorney, Agent, or Firm* — Harrity & Harrity, LLP (57) ABSTRACT

A service deployment manager may receive a service request that includes data identifying a service to be deployed in a cloud computing environment, data identifying an execution environment in which the service is to be deployed, data identifying a framework on which the service is to be deployed, and data identifying a version strategy to be applied to the service. The service deployment manager may receive data identifying a user account associated with the service request, and may determine that the user account has permission to deploy the requested service. The service deployment manager may identify a service template, based on the service, that specifies a virtual hardware configuration, and may provide, to a service deployment platform, instructions to deploy the service using the virtual hardware configuration. The instructions may include the data identifying the execution environment, the data identifying the framework, and the data identifying the version strategy.

18 Claims, 6 Drawing Sheets

Related U.S. Application Data continuation of application No. 16/107,661, filed on Aug. 21, 2018, now Pat. No. 10,320,625.

(51) Int. Cl.
*H04L 29/06* (2006.01)
*H04L 29/08* (2006.01)
*G06F 9/455* (2018.01)
*G06F 8/60* (2018.01)
*G06F 21/62* (2013.01)

(52) U.S. Cl.
CPC .......... *G06F 21/31* (2013.01); *G06F 21/629* (2013.01); *H04L 41/0806* (2013.01); *H04L 41/0843* (2013.01); *H04L 63/102* (2013.01); *H04L 67/16* (2013.01); *H04L 67/34* (2013.01); *G06F 2009/45562* (2013.01)

(58) Field of Classification Search
CPC ... H04L 41/0806; G06F 8/60; G06F 9/45558; G06F 21/31; G06F 21/629
USPC .................................................. 709/226, 203
See application file for complete search history.

(56) References Cited

U.S. PATENT DOCUMENTS

| | | | |
|---|---|---|---|
| 6,606,744 B1 | 8/2003 | Mikurak | |
| 6,611,867 B1 | 8/2003 | Bowman-Amuah | |
| 6,938,250 B2 | 8/2005 | Cohen et al. | |
| 7,137,114 B2 | 11/2006 | Rich et al. | |
| 7,295,119 B2* | 11/2007 | Rappaport | H04L 43/00 340/572.4 |
| 7,448,034 B2 | 11/2008 | Anderson et al. | |
| 7,620,948 B1 | 11/2009 | Rowe et al. | |
| 7,657,887 B2 | 2/2010 | Kothandaraman et al. | |
| 7,734,783 B1* | 6/2010 | Bourke | H04L 67/1002 709/226 |
| 7,770,151 B2* | 8/2010 | Sanjar | G06F 11/366 717/109 |
| 7,996,829 B2 | 8/2011 | Depew et al. | |
| 8,041,735 B1 | 10/2011 | Lacapra et al. | |
| 8,082,541 B2 | 12/2011 | Pramanick et al. | |
| 8,094,647 B2* | 1/2012 | Elliott | H04L 29/06 370/352 |
| 8,095,923 B2 | 1/2012 | Harvey et al. | |
| 8,108,855 B2 | 1/2012 | Dias et al. | |
| 8,327,351 B2 | 12/2012 | Paladino et al. | |
| 8,346,929 B1* | 1/2013 | Lai | H04L 63/20 709/226 |
| 8,539,479 B2 | 9/2013 | Kemmler et al. | |
| 8,595,715 B2 | 11/2013 | Ward et al. | |
| 8,606,846 B2* | 12/2013 | Czechowski, III | H04L 67/1012 709/203 |
| 8,661,132 B2 | 2/2014 | Dorai et al. | |
| 8,793,683 B2 | 7/2014 | Dehaan et al. | |
| 8,978,029 B2 | 3/2015 | Schwaninger | |
| 9,009,698 B2 | 4/2015 | Zomaya | |
| 9,244,669 B2* | 1/2016 | Govindaraju | G06F 3/04842 |
| 9,268,592 B2 | 2/2016 | Hassine et al. | |
| 9,477,454 B2* | 10/2016 | Scheiner | G06F 8/61 |
| 9,513,901 B2* | 12/2016 | Chen | G06F 16/2379 |
| 9,652,211 B2 | 5/2017 | Rachamadugu et al. | |
| 9,898,393 B2 | 2/2018 | Moorthi et al. | |
| 9,952,856 B2* | 4/2018 | Wetzold | H04W 4/60 |
| 9,996,374 B2 | 6/2018 | Sieffert et al. | |
| 10,320,625 B1 | 6/2019 | Cherumbath | |
| 10,681,176 B1* | 6/2020 | Lewis | G06F 8/36 |
| 10,684,940 B1* | 6/2020 | Kayal | G06F 11/3664 |
| 10,797,967 B2 | 10/2020 | Cherumbath | |
| 10,810,361 B1* | 10/2020 | Venkatraman | H04L 63/101 |
| 2005/0289536 A1 | 12/2005 | Nayak et al. | |
| 2006/0136897 A1 | 6/2006 | Laxminarayan et al. | |
| 2013/0232463 A1 | 9/2013 | Nagaraja et al. | |
| 2013/0297803 A1 | 11/2013 | Hate et al. | |
| 2014/0143422 A1 | 5/2014 | Joseph et al. | |
| 2017/0371636 A1 | 12/2017 | Palavalli et al. | |

OTHER PUBLICATIONS

Bushehrian et al, "An INLP Approach For Simulated-Based Automatic Object Deployment", IEEE, pp. 103-108 (Year: 2011).*

Fittkau et al., "Simulating Cloud Deployment Options for Software Migration Support", IEEE, pp. 37-46 (Year: 2012).*

Agmon et al., "Deployment Optimization of IoT Devices through Attack Graph Analysis", IEEE, 192-202 (Year: 2019).*

Zoghi et al, "Designing Adaptive Applications Deployed on Cloud Environments", ACM, pp. 1-26 (Year: 2016).*

Atkins D. L., et al., "Using Version Control Data to Evaluate the Impact of Software Tools," ACM, 1999, pp. 324-333.

Becker P., et al., "Strategy to Improve Quality for Software Applications: A Process View," Association for Computing Machinery, 2011, pp. 129-138.

Bertino N., "Modern Version Control: Creating an Efficient Development Ecosystem," Proceedings of the 40th Annual ACM SIGUCCS Conference on User Services, Oct. 2012, pp. 219-222.

Chamarty S., et al., "An Authorization Scheme for Version Control Systems," Proceedings of the 16th ACM Symposium on Access Control Models and Technologies, Jun. 2011, pp. 123-132.

Gui B., et al., "Enhancing Deployment Architecture for Distributed Software Systems with an Active Coordination Model," IEEE 5th International Conference on Software Engineering and Service Science, 2014, pp. 24-27.

Heimly V., "Standardization, Innovation and Deployment of Electronic Referral Software in Norway," Journal of Telemedicine and Telecare, 2008, pp. 14 (7), pp. 359-362.

Herrick D.R., et al., "Sustainable Automated Software Deployment Practices," ACM, 2013, pp. 189-196.

Kaur P., et al., "Version Management and Composition of Software Components in Different Phases of Software Development Life cycle," Association for Computing Machinery, Jul. 2009, vol. 34 (4), pp. 1-9.

Tai K. C., et al., "Evaluation of a Predicate-based Software Testing Strategy," IBM Systems Journal, 1994, pp. 445-457.

Tyndall J.B.,"Building an Effective Software Deployment Process," ACM, 2012, pp. 109-114.

Yoshimura K., et al., "Defining a Strategy to Introduce a Software Product Line Using Existing Embedded Systems," Association for Computing Machinery, Oct. 2006, pp. 63-72.

* cited by examiner

MANAGING SERVICE DEPLOYMENT

RELATED APPLICATIONS

This application is a continuation of U.S. patent application Ser. No. 16/406,259, filed May 8, 2019 (now U.S. Pat. No. 10,797,967), which is a continuation of U.S. patent application Ser. No. 16/107,661, filed Aug. 21, 2018 (now U.S. Pat. No. 10,320,625), which are incorporated herein by reference.

BACKGROUND

Software deployment includes activities necessary to make a software system or application (e.g., that implements a service) available for use. Software deployment may include development, testing, updating, activation, and/or the like. Software deployment may include multiple iterations, and/or may include various environments, frameworks, and/or hardware configurations.

SUMMARY

According to some possible implementations, a method may include providing, by a device, a user interface for accepting user input, and receiving, by the device and through the user interface, a service request from a user device. The service request may include data identifying a service to be deployed in a cloud computing environment, data identifying an execution environment in which the service is to be deployed, data identifying a framework on which the service is to be deployed, and data identifying a version strategy to be applied to the service. The method may include receiving, by the device and from the user device, data identifying a user account associated with the service request, and determining, by the device and based on the user account, that the user account has permission to deploy the requested service. The method may include identifying, by the device, a service template based on the service, and the service template may specify a virtual hardware configuration. The method may include providing, by the device and to a service deployment platform, instructions to deploy the service using the virtual hardware configuration. The instructions may include the data identifying the execution environment, the data identifying the framework, and the data identifying the version strategy.

According to some implementations, a device may include one or more memories, and one or more processors, communicatively coupled to the one or more memories, to receive, from a user device, data identifying a service to be deployed in a cloud computing environment. The one or more processors may receive, from the user device, data identifying an execution environment in which the service is to be deployed, and may receive, from the user device, data identifying a framework on which the service is to be deployed. The one or more processors may receive, from the user device, data identifying a version strategy to be applied to the service, and may receive, from the user device, data identifying a user account associated with the service. The one or more processors may determine, based on the user account, that the user account has permission to deploy the service. The one or more processors may identify a service template based on the service, and the service template may specify a virtual hardware configuration. The one or more processors may provide, to a service deployment platform, instructions to deploy the service using the virtual hardware configuration. The instructions may include the data identifying the execution environment, the data identifying the framework, and the data identifying the version strategy.

According to some implementations, a non-transitory computer-readable medium may store instructions that include one or more instructions that, when executed by one or more processors of a device, cause the one or more processors to receive data identifying a service to be deployed in a cloud computing environment. The one or more instructions may cause the one or more processors to receive data identifying a version strategy to be applied to the service, and to receive data identifying a user account associated with the service. The one or more instructions may cause the one or more processors to determine, based on the user account, that the user account has permission to deploy the service. The one or more instructions may cause the one or more processors to identify a service template based on the service, and the service template may specify a virtual hardware configuration. The one or more instructions may cause the one or more processors to determine a version of the service based on the version strategy. The one or more instructions may cause the one or more processors to provide, to a service deployment platform, instructions to deploy the service using the virtual hardware configuration and the version.

DETAILED DESCRIPTION

The following detailed description of example implementations refers to the accompanying drawings. The same reference numbers in different drawings may identify the same or similar elements.

Services include software applications, which are often designed to perform one or more actions as a service to users that interact with the service via computing devices. While a service is developed, tested, updated, and put into production, the service may go through multiple iterations, or versions, and be developed in various environments, using various frameworks, and various hardware configurations. In a situation where multiple services are developed, tested, updated, and placed into production by multiple developers or other users associated with the services, the management of the services, including the manner in which the services are deployed, becomes complex, prone to error, and potentially inefficient.

Some implementations, described herein, provide a service deployment manager, according to the present invention, designed to facilitate deploying services at both small and large scale, enabling one or more organizations to develop, test, update, and place into production, multiple services on behalf of multiple users and with various deployment configurations. For example, a service deployment manager may receive a service request that specifies a service to be deployed in a cloud computing environment. The service request may be provided through a user interface (e.g., a web interface, application interface, and/or the like) accessible to a user (e.g., a developer, tester, and/or the like), and may include a variety of information to be used in deploying the service (e.g., execution environment, software framework, version strategy, and/or the like). The service deployment manager may also receive user account information associated with the user requesting deployment of the service and verify that the user is permitted to deploy the service (with the configuration details associated with the service). The service deployment manager may obtain a service template for the service (e.g., the service template including a virtual hardware configuration to be used for deploying the service) and provide instructions to a service deployment platform. In some implementations, the service deployment manager may facilitate the determination of a version number for the service based on the version strategy provided by the user. The instructions provided to the service deployment platform may include information needed for the service deployment platform to deploy the service, such as the virtual hardware configuration, execution environment, framework, number of instances, version strategy, and/or the like, and may also cause the service deployment platform to deploy the service in accordance with the instructions.

In this way, a service deployment manager may facilitate the deployment of services in a manner designed to be convenient, secure, and efficient. Convenience may be provided by providing a user interface that enables developers or other users to easily provide information to be used for deploying a service. Security may be provided by using user account verification for various aspects of a deployment, including verification that a user is permitted to deploy a service and verification that the user is permitted to deploy a service in a particular environment, on a particular framework, using a particular virtual hardware configuration, and/or the like. Efficiency may be improved in a variety of ways, including the use of service templates designed to use an appropriate virtual hardware configuration for service deployment. Several different stages of the process for managing service deployment are automated, which may improve speed and efficiency of the process and conserve computing resources (e.g., processor resources, memory resources, and/or the like). Furthermore, implementations described herein use a rigorous, computerized process to perform tasks or roles that were not previously performed. Also, automating the process for managing service deployment conserves computing resources (e.g., processor resources, memory resources, and/or the like) that would otherwise be wasted by using manual investigative processes for attempting to determine whether a user is authorized to deploy a service, which virtual hardware configuration should be used for deploying a particular service, and/or the like.

Figure 1:
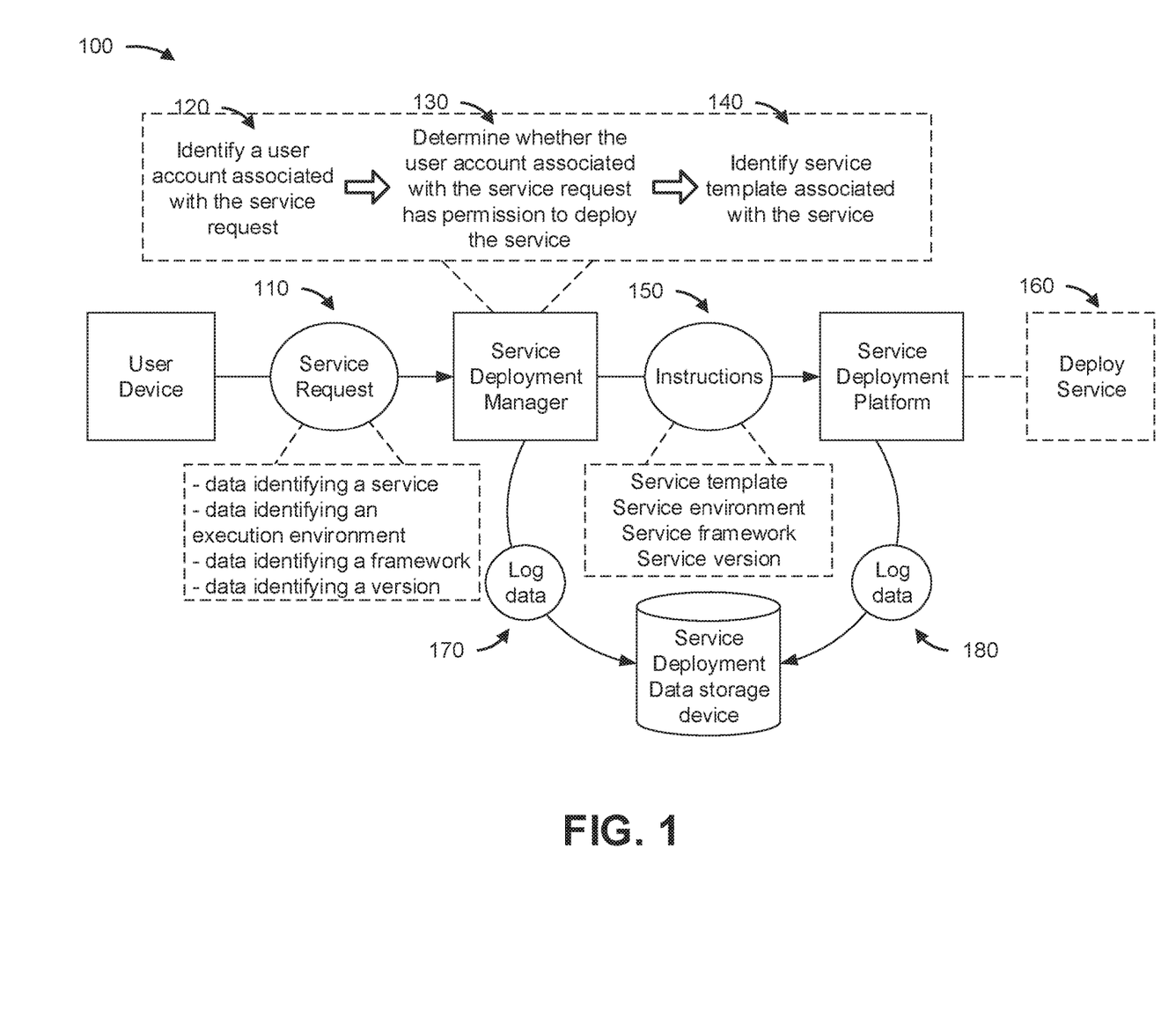
FIG. 1 is a diagram of an example implementation described herein.

FIG. 1 is a diagram of an overview of an example implementation 100 described herein. As shown in FIG. 1, example implementation 100 includes a user device; a service deployment manager; and a service deployment platform. While the devices of implementation 100 are depicted separately, in some implementations, the functionality of one or more of the devices of implementation 100 may be included in another device, or may be included in multiple, distributed devices.

As shown by reference number 110, the service deployment manager receives a service request from a user device. The service request may include, or otherwise be associated with, a variety of information related to the deployment of a service. For example, the service request may include data identifying a service to be deployed, data identifying an execution environment for the service (e.g., development environment, testing environment, integration environment, pre-production environment, production environment, and/or the like), data identifying a framework for the service (e.g., distributed system software designed with built in applications and application programming interfaces (APIs) to manage distributed services), data identifying a version strategy for determining the version of the service, and/or the like.

In some implementations, the service deployment manager may receive the service request and other information via a user interface. For example, the service deployment manager may provide a web interface, application interface, and/or the like, which is capable of receiving data associated with a service request. By way of example, the service deployment manager may include or be associated with a web server that provides a web page, including fields for a user (e.g., a developer associated with the user device) to provide user input specifying a particular service, an execution environment, framework, and version strategy for the particular service, and/or other information relevant to deploying the particular service.

In some implementations, an intermediary device may receive the service request from the user device and provide the information related to the deployment of the service to the service deployment manager. For example, a deployment automation server may receive the service request and provide the service deployment manager with the information related to the deployment. In this situation, the deployment automation server may serve as the front-end for receiving requests from user devices, which are then handled by the service deployment platform. In some implementations, the functionality of the deployment automation server and functionality of the service deployment manager may be performed by a single device (e.g., separate applications operating on a single device or group of devices).

In some implementations, the service request may include or otherwise be associated with data indicating that the service request is for a simulated deployment. When requesting a simulated deployment, the service deployment manager may take any or all of the actions (e.g., as described in further detail below) designed to deploy the service identified in the service request. However, rather than actually causing deployment of the service, the service deployment manager may perform other actions designed to provide one or more users with knowledge of regarding deployment of the service (e.g., resources that would be used, whether a user has permission to deploy the service, and/or the like).

As shown by reference number 120, the service deployment manager identifies a user account associated with the service request. In some implementations, data identifying the user account may be included in the service request. In some implementations, the user associated with the user device may provide data identifying the user account. Data identifying the user account may include, for example, a user name, a user name and password combination, a cryptographic identifier, a web cookie, and/or other information designed to identify the user requesting deployment of the service.

As shown by reference number 130, the service deployment manager determines whether the user associated with the user device has permission to deploy the service. In some implementations, the service deployment manager may store data that maps various permissions with users, user roles, and/or the like (which are identified based on the data identifying the user account). For example, a user account may be mapped to a set of services that the corresponding user has permission to deploy and/or simulate. In some implementations, permissions may be more specific or granular, e.g., restricting access to various service deployment options, such as permissions associated with execution environments, frameworks, virtual hardware configurations, number of instances of a service, version strategies, simulations, and/or the like. For example, a user (or all users associated with a particular role), may have limitations on the environment in which the user can deploy a service (e.g., a particular developer may have permission to deploy services in a production and testing environment, but not into a production environment). In a situation where the user is determined to not have permission to deploy the service as requested, the service deployment manager may perform a variety of actions (e.g., deny the service request, notify another user or device, suggest alternate service options for which the user has permission, and/or the like). In some implementations, permissions for simulating a deployment may be different from those for requesting an actual deployment, enabling users who might not have permission to deploy a service to simulate the service's deployment before taking results of the simulation to a user that does have permission to deploy the service.

As another example, a service deployment may be associated with a cost, or score, which may be used to determine whether the user has permission to deploy the service. By way of example, a service may be associated with deployment options (e.g., execution environment, framework, virtual hardware configuration, and/or the like) that are each associated with a cost (e.g., a financial cost, resource cost, and/or the like). In this situation, the user attempting to deploy the service may have a corresponding permission that specifies a cost threshold that limits the costs that the user is allowed to incur for deployment of a service. In a situation where the cost exceeds an amount the user is permitted to incur, the service deployment manager may take action (e.g., deny the service request, notify another user or device, suggest alternate service options that are within the cost threshold for the user, and/or the like).

In some implementations, the service deployment manager may provide the ability to control permissions to deploy services at multiple levels as long as the user is authorized to do so. In this situation, a set of services may be grouped to form a group of services. Multiple groups of services may be further grouped to form categories. A set of categories may be grouped into environments, and so on. A user who is authorized to deploy just one of the services may be denied from deploying an entire group or category of services, and a user who is authorized to deploy all services within multiple groups may have permission to deploy the entire group of services for which the user is authorized. In this way, the service deployment manager may use permissions to provide both high level and granular control over service deployments.

In this way, the service deployment manager is able to ensure that service deployment requests are associated with the proper permissions, and that requests without permission may be handled appropriately. The actions of the service deployment manager may enable quick and automated service deployments, which may improve user experience and facilitate the conservation of various resources (e.g., computing resources, network resources, human resources, and/or the like).

As shown by reference number 140, the service deployment manager identifies a service template associated with the service. The service template specifies a virtual hardware configuration for the service. The virtual hardware configuration includes, for a particular service, virtual hardware resources that are to be allocated to perform the particular service. For example, virtual hardware resources may include a number and/or type of processors, an amount and/or type of memory, an amount and/or type of data storage, a type of network connection, a target server, a target rack, an operating system, firmware, software, and/or the like.

In some implementations, service templates are previously created by one or more developers and stored in a manner designed to be accessible to the service deployment manager. For example, users associated with a central authority may be responsible for generating service templates, using the service deployment manager or a separate device. The users creating the service templates may be associated with permissions that enable the users to create, edit, and/or remove service templates. In some implementations, service templates are stored along with data specifying the revision history for the service templates, enabling the changes in service templates to be easily and safely tracked, rolled back, and/or updated. In a situation where a user creates or updates a service template, the service deployment manager, or another device, may trigger a review cycle, in which other users are required to review and approve the new or updated service template in a manner designed to ensure the service template is valid and accurate.

In some implementations, a service may be associated with multiple service templates. For example, a service may be associated with different templates to be used for different deployment options and/or for different users. By way of example, for a particular service, a service template for the particular service may be different for a development environment than a service template for the particular service in a testing environment or production environment. As another example, a service template for the particular service may be different depending on a number of instances of the service to be deployed (e.g., for a first number or range of instances, a first service template may be used, while a second service template may be used for a second number or range of instances, and so on). Additionally, or alternatively, a service template may be based on the user account associated with the request for deployment. For example, users may have been associated with preferred service templates for particular services, users may be associated with service templates that correspond to the users' permissions (e.g., templates for one type of user may allow for more virtual hardware resources than another type of user), and/or the like.

The service template may be identified by the service deployment manager in a variety of ways. In some implementations, data that maps services, user accounts, service deployment options, and/or the like to service templates may be stored by or otherwise accessible to the service deployment manager (e.g., stored in the service deployment data storage device, another data storage device, a separate device, and/or the like). The deployment manager may identify the service template to be used based on the mapping. In a situation where multiple service templates could be used to deploy the service, the service deployment manager may identify the service template to be used in a variety of ways. For example, the service deployment manager may use a priority scheme where certain types of templates have higher priority than others (e.g., more granular or specific templates may have priority over general service templates, and user account specific templates may have a highest priority). As another example, the service deployment manager may determine which service template to use based on available resources (e.g., in a situation where resources are limited and some service templates require more resources than the resources available for deployment). In some implementations, user input may be used to determine which service template to be used (e.g., a user may be presented with a choice of service templates to be used).

In some implementations, the service deployment manager may enable a user (e.g., the user associated with the user device and/or the service request) to modify a template. For example, in a situation where the service deployment manager has identified a service template for the service, the service deployment manager may present one or more of the virtual hardware configuration options to the user, enabling the user to change one or more of the virtual hardware configuration options (e.g., to add or remove virtual hardware resources to be used to deploy the service). In this situation, the changes the user is allowed to make to a service template and/or virtual hardware configuration may be based on permissions associated with the user's user account (e.g., a user may only be permitted to make changes that the user has permission to make).

In this way, the service deployment manager may facilitate the identification and selection of a service template that can be used (and re-used) for deploying particular services. The use of service templates may increase efficiency of the service deployment process (e.g., by quickly identifying and selecting an appropriate virtual hardware configuration), lead to fewer errors (e.g., relative to manual configuration of virtual hardware), and improve user experience with service deployment (e.g., enabling users to deploy a service with an appropriate virtual hardware configuration, without requiring prior knowledge of what an appropriate virtual hardware configuration might be).

As shown by reference number 150, the service deployment manager provides the service deployment platform with instructions to deploy the service. The instructions may include a variety of information designed to enable and/or cause the service deployment platform to deploy the requested service. For example, the instructions may include data identifying the service, the service template (e.g., with the virtual hardware configuration), the service environment, the service framework, the service version, and/or the like. In some implementations, the instructions may include a link to an image of the service (e.g., an image that was previously prepared by the user for deployment). The image may be, for example, a container image (such as a Docker image, AppC image, and/or the like) that includes executable code and data representing service infrastructure. Providing the service deployment platform with instructions that include a link to an image for the service enables the service deployment platform to obtain the image and use the image, in addition to other information included in the instructions, to deploy the service.

In some implementations, the service deployment manager or the service deployment platform may use version strategy data provided (by the user and/or in the instructions) to determine a version number for the service. A version number is often a numeric, or alpha-numeric, designation of the version of the service being deployed. As developers make changes to a service, the version number may also be changed in accordance with a version strategy, versioning software, and/or the like. By way of example, a service may be associated with a particular version, such as version 1.1.1. In a situation where a developer provides, in version strategy data, information indicating that changes made to the service are minor, the service deployment manager (or service deployment platform) may use the information to update the version number (e.g., to 1.1.2 for minor changes). For moderate changes to the service, the version number may be updated from version 1.1.1 to version 1.2.1 and, for major updates to the service, the version number may be updated from version 1.1.1 to version 2.1.1. The actual changes to the version numbers, and the criteria for the various changes, may depend on the version strategy data provided by the user and version method being used for the service.

In some implementations, the service deployment manager provide data identifying the service, the service template (e.g., with the virtual hardware configuration), the service environment, the service framework, the service version, and/or the like, to another device as simulation results (e.g., in a situation where the service request was for a simulation of a deployment, rather than a request for an actual deployment). In this situation, the service deployment manager may provide at least a portion of the foregoing information to the user device, enabling the user of the user device to see how the service would be deployed. As another example, the service deployment manager may provide at least a portion of the foregoing information to a separate device, including separate user devices, that might be associated with users who are to receive simulation results (e.g., users specified by the service request, users set by default to receive simulation results, and/or the like).

As shown by reference number 160, the service deployment platform deploys the service. The service deployment platform may deploy the service using the instructions provided by the service deployment manager (e.g., including the service template, the service environment, the service framework, the service version, and/or the like). For example, the service deployment platform may include a cloud computing environment that makes use of virtual hardware resources to execute various applications, including services, and make those services (and/or the results of the services) available to users (e.g., the user associated with the user device, and/or other users). The virtual resources used to deploy the service may be re-assigned and/or re-used, for example, when the service is ended (e.g., ended by the user, by the service deployment platform, ended based on predetermined criteria, and/or the like). The use of a service deployment platform may enable the deployment of a large variety of services on behalf of a variety of users, which may facilitate, for example, development of services by developers who frequently update and deploy services in various environments, with various virtual hardware configurations, and/or the like.

As shown by reference number 170, the service deployment manager provides log data to be stored in the service deployment data storage device. Log data may include any information associated with the deployment of a service (or a failed service deployment or a simulated service deployment). For example, data identifying the user or user account associated with the request, the service, the service environment, the service framework, the service version strategy, and/or the like, may be logged by the service deployment manager. In some implementations, as shown by reference number 180, the service deployment platform may provide log data to be stored in the service deployment data storage device (or a separate data storage device). The log data provided by the service deployment platform may be the same as or different from the log data provided by the service deployment manager. In some implementations, the service deployment platform may also provide log data indicating results of a service deployment (e.g., whether the deployment was successful, how long the service was deployed, when the service was deployed and/or ended, virtual hardware resources used, any errors encountered, and/or the like).

Log data may be used for a variety of purposes, such as service deployment auditing, analytics, reporting, and/or the like. In some implementations, the service deployment manager may use the log data to determine whether a service template should be updated. For example, in a situation where log data indicates that a service deployed using a particular service template is not using the virtual hardware resources to which it is assigned according to the service template, the service deployment manager may update the particular service template (e.g., decrease virtual hardware resources to conserve virtual hardware resources, lower costs, free up virtual hardware resources for other services, and/or the like). Similarly, in a situation where a service deployed using a particular service template is maximizing the virtual hardware resources available to it, the service deployment manager may update the particular service template to increase the virtual hardware resources to be used when deploying the service in the future.

In this way, a service deployment manager may facilitate the deployment of services in a manner designed to be convenient, secure, and efficient. Convenience may be provided by providing a user interface that enables developers or other users to easily provide information to be used for deploying a service and to limit the knowledge required to select virtual hardware resources for deployment. Security may be provided by using user account verification for various aspects of a deployment, including verification that a user is permitted to deploy a service and verification that the user is permitted to deploy a service in a particular environment, on a particular framework, using a particular virtual hardware configuration, and/or the like. Efficiency may be improved in a variety of ways, including the use of service templates designed to use an appropriate virtual hardware configuration for service deployment. Several different stages of the process for managing service deployment are automated, which may improve speed and efficiency of the process and conserve computing resources (e.g., processor resources, memory resources, and/or the like). Furthermore, implementations described herein use a rigorous, computerized process to perform tasks or roles that were not previously performed. Also, automating the process for managing service deployment conserves computing resources (e.g., processor resources, memory resources, and/or the like) that would otherwise be wasted by using manual investigative processes for attempting to determine whether a user is authorized to deploy a service, which virtual hardware configuration should be used for deploying a particular service, and/or the like.

As indicated above, FIG. 1 is provided merely as an example. Other examples are possible and may differ from what was described with regard to FIG. 1.

Figure 2:
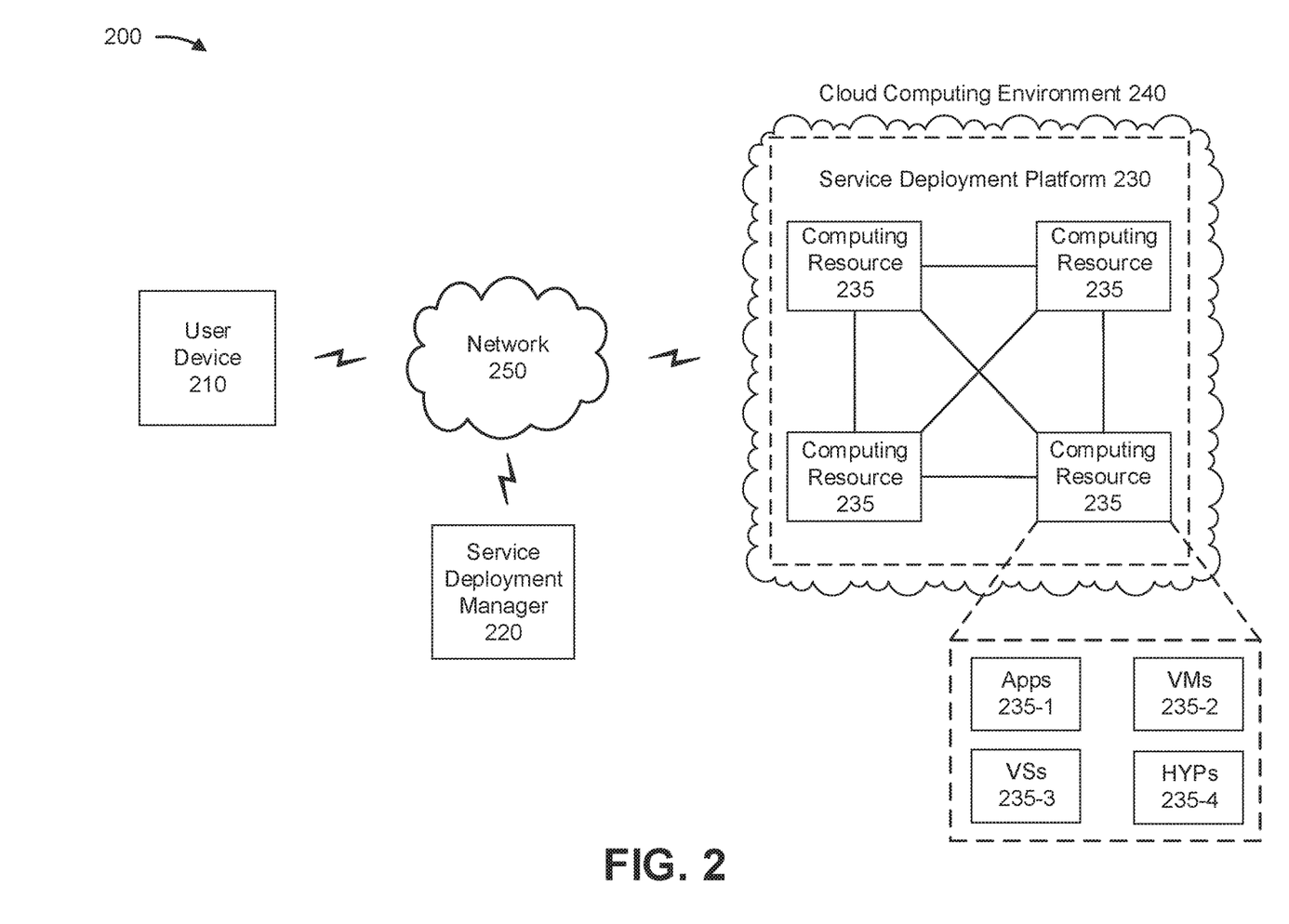
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a service deployment manager 220, a service deployment platform 230, a computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with deploying a service. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may receive information associated with a service request from a user (e.g., via a user interface), and may provide a service request (e.g., including data identifying a service, data identifying an execution environment, data identifying a framework, data identifying a version, and/or the like) to service deployment manager 220.

Service deployment manager 220 includes one or more devices capable of receiving, generating, storing, processing, and/or providing information associated with deploying services. For example, service deployment manager 220 may include a communication and/or computing device, such as a mobile phone (e.g., a smart phone, a radiotelephone, etc.), a laptop computer, a tablet computer, a handheld computer, a gaming device, and/or a wearable communication device (e.g., a smart wristwatch, a pair of smart eyeglasses, etc.), and/or may include a server device (e.g., a host server, a web server, an application server, etc.), a data center device, or a similar device. In various implementations, service deployment manager 220 may be hosted in a cloud computing environment, may be implemented outside of a cloud computing environment, or may be partially cloud-based.

Service deployment platform 230 includes one or more devices capable of receiving, generating, storing, processing, and/or providing information associated with deploying a service. For example, service deployment platform 230 may include a server device (e.g., a host server, a web server, an application server, etc.), a data center device, or a similar device. Service deployment platform 230 may be capable of receiving data associated with a service template, service environment, service framework, and/or the like, and deploying a service based on the data received. In some implementations, as shown, service deployment platform 230 may be hosted in cloud computing environment 240. Notably, while implementations described herein describe service deployment platform 230 as being hosted in cloud computing environment 240, in some implementations, service deployment platform 230 might not be cloud-based (i.e., may be implemented outside of a cloud computing environment 240) or might be partially cloud-based.

Cloud computing environment 240 includes an environment that delivers computing as a service, whereby shared resources, services, etc. may be provided to service deployment platform 230. Cloud computing environment 240 may provide computation, software, data access, storage, and/or other services that do not require end-user knowledge of a physical location and configuration of a system and/or a device that delivers the services. As shown, cloud computing environment 240 may include a service deployment platform 230 and a computing resource 235.

Computing resource 235 includes one or more personal computers, workstation computers, server devices, or another type of computation and/or communication device. In some implementations, computing resource 235 may host service deployment platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with service deployment platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
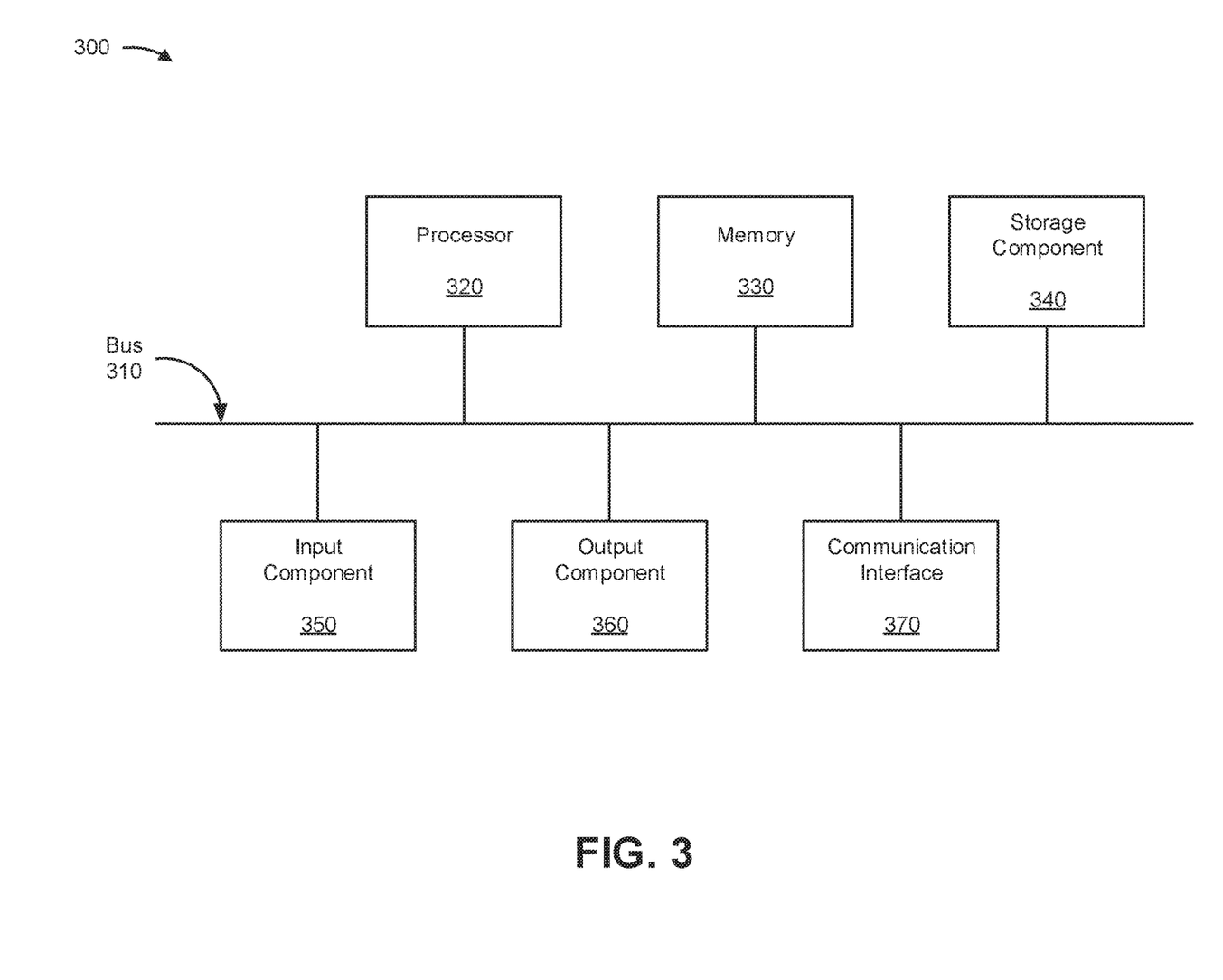
FIG. 3 is a diagram of example components of one or more devices of FIG. 2.

FIG. 3 is a diagram of example components of a device 300. Device 300 may correspond to user device 210, service deployment manager 220, service deployment platform 230, and/or computing resource 235. In some implementations, user device 210, service deployment manager 220, service deployment platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
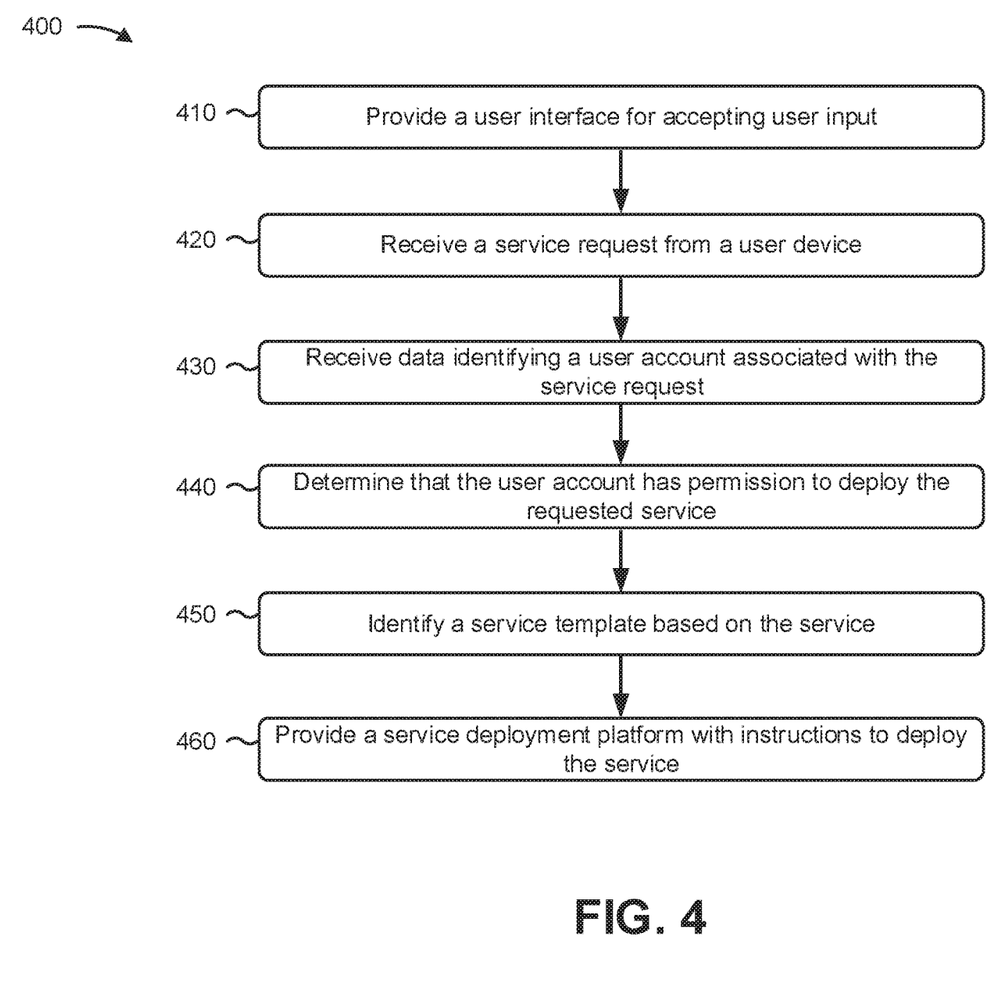
FIGS. 4-6 are flow charts of example processes for managing deployment of a service.

FIG. 4 is a flow chart of an example process 400 for managing deployment of a service. In some implementations, one or more process blocks of FIG. 4 may be performed by a service deployment manager (e.g. service deployment manager 220). In some implementations, one or more process blocks of FIG. 4 may be performed by another device or a group of devices separate from or including service deployment manager (e.g. service deployment manager 220), such as a user device (e.g. user device 210), a service deployment platform (e.g. service deployment platform 230), and/or a computing resource (e.g. computing resource 235).

As shown in FIG. 4, process 400 may include providing a user interface for accepting input (block 410). For example, the service deployment manager (e.g., using processor 320, memory 330, storage component 340, input component 350, communication interface 370, and/or the like) may provide a user interface for accepting user input, as described above in connection with FIG. 1.

As further shown in FIG. 4, process 400 may include receiving a service request from a user device (block 420). For example, the service deployment manager (e.g., using processor 320, memory 330, storage component 340, input component 350, communication interface 370, and/or the like) may receive, through the user interface, a service request from a user device, as described above in connection with FIG. 1. In some implementations, the service request may include data identifying a service to be deployed in a cloud computing environment, data identifying an execution environment in which the service is to be deployed, data identifying a framework on which the service is to be deployed, and data identifying a version strategy to be applied to the service.

As further shown in FIG. 4, process 400 may include receiving data identifying a user account associated with the service request (block 430). For example, the service deployment manager (e.g., using processor 320, memory 330, storage component 340, input component 350, communication interface 370, and/or the like) may receive, from the user device, data identifying a user account associated with the service request, as described above in connection with FIG. 1.

As further shown in FIG. 4, process 400 may include determining that the user account has permission to deploy the requested service (block 440). For example, the service deployment manager (e.g., using processor 320, memory 330, storage component 340, and/or the like) may determine, based on the user account, that the user account has permission to deploy the requested service, as described above in connection with FIG. 1.

As further shown in FIG. 4, process 400 may include identifying a service template based on the service (block 450). For example, the service deployment manager (e.g., using processor 320, memory 330, storage component 340, and/or the like) may identify a service template based on the service, as described above in connection with FIG. 1. In some implementations, the service template specifying a virtual hardware configuration.

As further shown in FIG. 4, process 400 may include providing a service deployment platform with instructions to deploy the service (block 460). For example, the service deployment manager (e.g., using processor 320, memory 330, storage component 340, output component 360, communication interface 370, and/or the like) may provide, to a service deployment platform, instructions to deploy the service using the virtual hardware configuration, as described above in connection with FIG. 1. In some implementations, the instructions may include the data identifying the execution environment, the data identifying the framework, and the data identifying the version strategy.

Process 400 may include additional implementations, such as any single implementation or any combination of implementations described below and/or in connection with one or more other processes described elsewhere herein.

In some implementations, the data identifying the service may include a link to a container image. In some implementations, the container image may include executable code and data representing service infrastructure. In some implementations, the user interface may include one or more fields for receiving data associated with the service request.

In some implementations, the execution environment may include a development environment, a production environment, and/or an integration environment. In some implementations, the framework may be one of a plurality of service frameworks. In some implementations, the version strategy may include information designed to indicate how a version number associated with the service is to be changed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
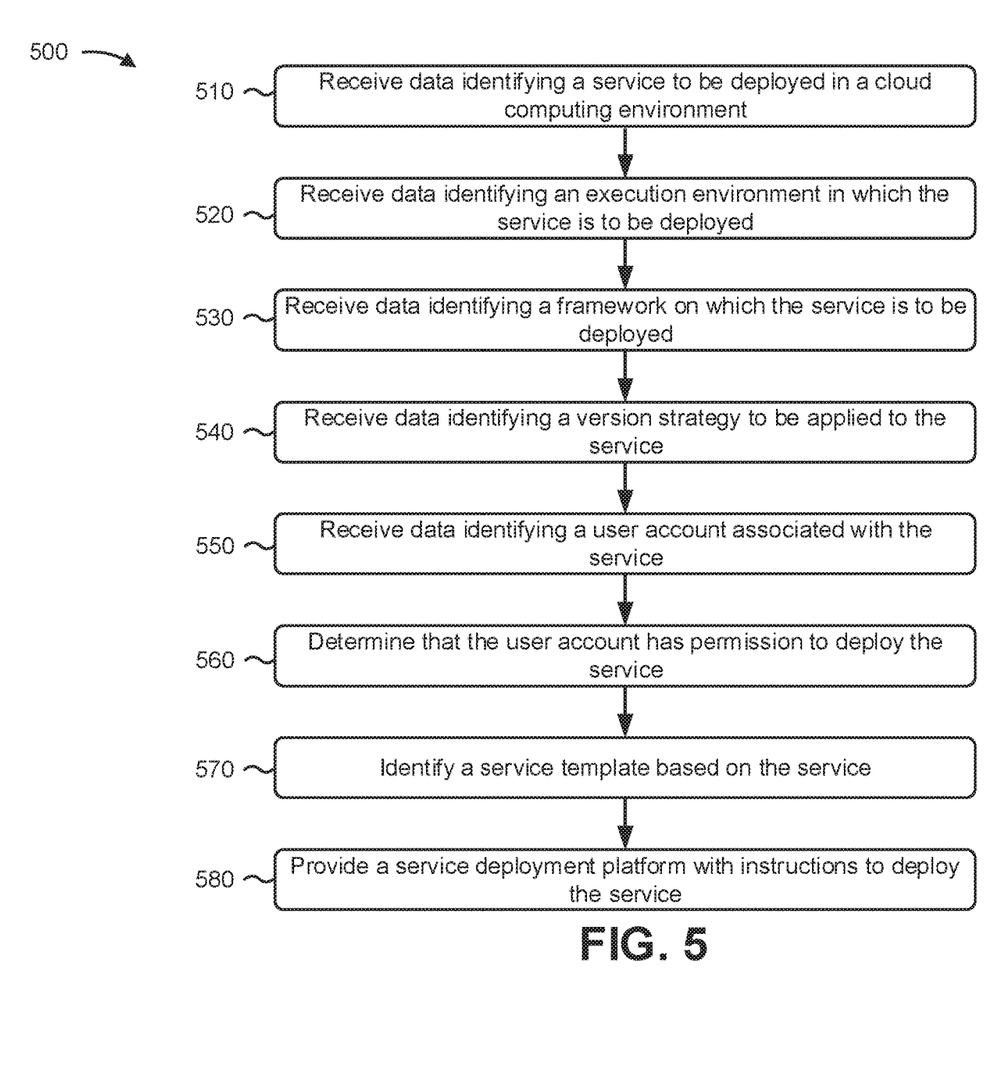

FIG. 5 is a flow chart of an example process 500 for managing deployment of a service. In some implementations, one or more process blocks of FIG. 5 may be performed by a service deployment manager (e.g. service deployment manager 220). In some implementations, one or more process blocks of FIG. 5 may be performed by another device or a group of devices separate from or including service deployment manager (e.g. service deployment manager 220), such as a user device (e.g. user device 210), a service deployment platform (e.g. service deployment platform 230), and/or a computing resource (e.g. computing resource 235).

As shown in FIG. 5, process 500 may include receiving, from a user device, data identifying a service to be deployed in a cloud computing environment (block 510). For example, the service deployment manager (e.g., using processor 320, memory 330, storage component 340, input component 350, communication interface 370, and/or the like) may receive, from a user device, data identifying a service to be deployed in a cloud computing environment, as described above in connection with FIG. 1.

As further shown in FIG. 5, process 500 may include receiving, from the user device, data identifying an execution environment in which the service is to be deployed (block 520). For example, the service deployment manager (e.g., using processor 320, memory 330, storage component 340, input component 350, communication interface 370, and/or the like) may receive, from the user device, data identifying an execution environment in which the service is to be deployed, as described above in connection with FIG. 1.

As further shown in FIG. 5, process 500 may include receiving, from the user device, data identifying a framework on which the service is to be deployed (block 530). For example, the service deployment manager (e.g., using processor 320, memory 330, storage component 340, input component 350, communication interface 370, and/or the like) may receive, from the user device, data identifying a framework on which the service is to be deployed, as described above in connection with FIG. 1.

As further shown in FIG. 5, process 500 may include receiving, from the user device, data identifying a version strategy to be applied to the service (block 540). For example, the service deployment manager (e.g., using processor 320, memory 330, storage component 340, input component 350, communication interface 370, and/or the like) may receive, from the user device, data identifying a version strategy to be applied to the service, as described above in connection with FIG. 1.

As further shown in FIG. 5, process 500 may include receiving, from the user device, data identifying a user account associated with the service (block 550). For example, the service deployment manager (e.g., using processor 320, memory 330, storage component 340, input component 350, communication interface 370, and/or the like) may receive, from the user device, data identifying a user account associated with the service, as described above in connection with FIG. 1.

As further shown in FIG. 5, process 500 may include determining that the user account has permission to deploy the service (block 560). For example, the service deployment manager (e.g., using processor 320, memory 330, storage component 340, and/or the like) may determine, based on the user account, that the user account has permission to deploy the service, as described above in connection with FIG. 1.

As further shown in FIG. 5, process 500 may include identifying a service template based on the service (block 570). For example, the service deployment manager (e.g., using processor 320, memory 330, storage component 340, and/or the like) may identify a service template based on the service, as described above in connection with FIG. 1. In some implementations, the service template may specify a virtual hardware configuration.

As further shown in FIG. 5, process 500 may include providing, to a service deployment platform, instructions to deploy the service using the virtual hardware configuration (block 580). For example, the service deployment manager (e.g., using processor 320, memory 330, storage component 340, output component 360, communication interface 370, and/or the like) may provide, to a service deployment platform, instructions to deploy the service using the virtual hardware configuration, as described above in connection with FIG. 1. In some implementations, the instructions may include the data identifying the execution environment, the data identifying the framework, and the data identifying the version strategy.

Process 500 may include additional implementations, such as any single implementation or any combination of implementations described below and/or in connection with one or more other processes described elsewhere herein.

In some implementations, the service deployment manager may access data identifying permissions associated with the service. In some implementations, the permissions may specify at least one user account associated with permission to deploy the service. In some implementations, the permissions may specify, for the user account, a plurality of services that the user account is permitted to deploy. In some implementations, the plurality of services may include the service.

In some implementations, when determining, based on the user account, that the user has permission to deploy the service, the service deployment manager may determine that the user account has permission to deploy services in the execution environment, and deploy services using the virtual hardware configuration.

In some implementations, when identifying the service template based on the service, the service deployment manager may identify the service template from a plurality of service templates. In some implementations, each of the plurality of service templates may specify a different virtual hardware configuration. In some implementations, when identifying the service template based on the service, the service deployment manager may identify the service template from the plurality of service templates based on user input received from the user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
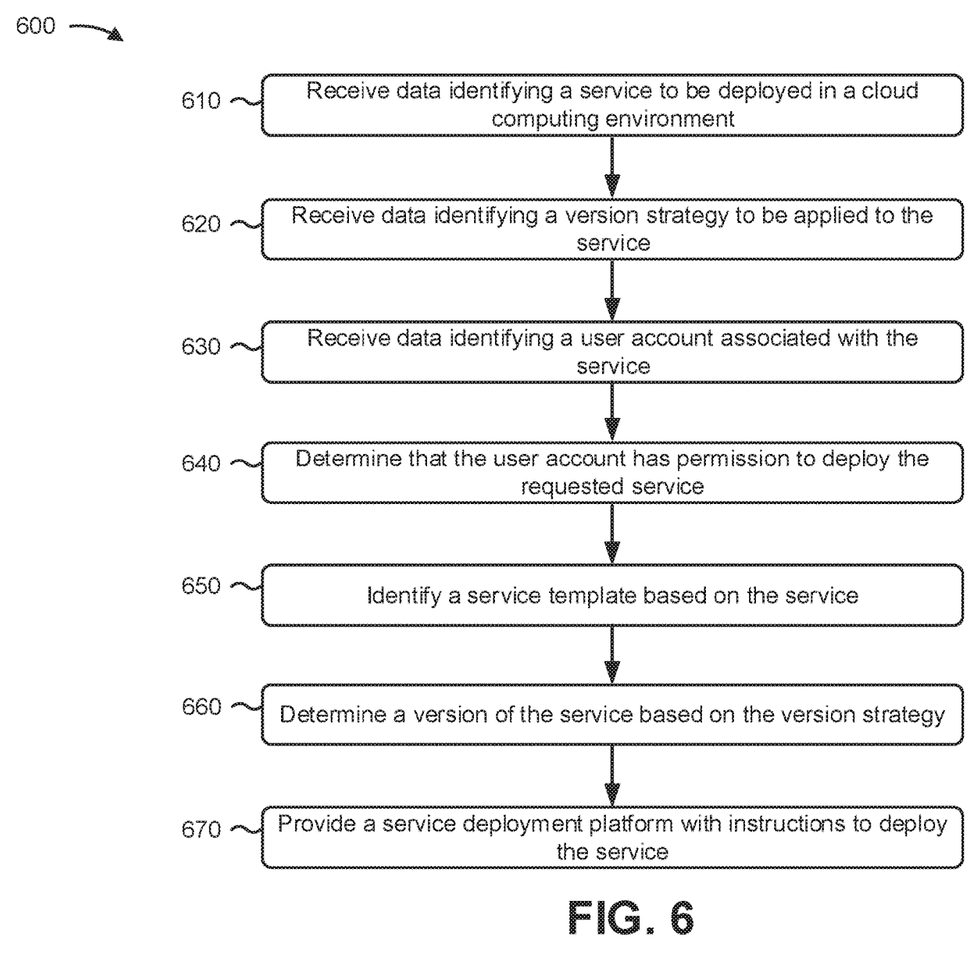

FIG. 6 is a flow chart of an example process 600 for managing deployment of a service. In some implementations, one or more process blocks of FIG. 6 may be performed by a service deployment manager (e.g. service deployment manager 220). In some implementations, one or more process blocks of FIG. 6 may be performed by another device or a group of devices separate from or including service deployment manager (e.g. service deployment manager 220), such as a user device (e.g. user device 210), a service deployment platform (e.g. service deployment platform 230), and/or a computing resource (e.g. computing resource 235).

As shown in FIG. 6, process 600 may include receiving data identifying a service to be deployed in a cloud computing environment (block 610). For example, the service deployment manager (e.g., using processor 320, memory 330, storage component 340, input component 350, communication interface 370, and/or the like) may receive data identifying a service to be deployed in a cloud computing environment, as described above in connection with FIG. 1.

As further shown in FIG. 6, process 600 may include receiving data identifying a version strategy to be applied to the service (block 620). For example, the service deployment manager (e.g., using processor 320, memory 330, storage component 340, input component 350, communication interface 370, and/or the like) may receive data identifying a version strategy to be applied to the service, as described above in connection with FIG. 1.

As further shown in FIG. 6, process 600 may include receiving data identifying a user account associated with the service (block 630). For example, the service deployment manager (e.g., using processor 320, memory 330, storage component 340, input component 350, communication interface 370, and/or the like) may receive data identifying a user account associated with the service, as described above in connection with FIG. 1.

As further shown in FIG. 6, process 600 may include determining, based on the user account, that the user account has permission to deploy the service (block 640). For example, the service deployment manager (e.g., using processor 320, memory 330, storage component 340, and/or the like) may determine, based on the user account, that the user account has permission to deploy the service, as described above in connection with FIG. 1.

As further shown in FIG. 6, process 600 may include identifying a service template based on the service (block 650). For example, the service deployment manager (e.g., using processor 320, memory 330, storage component 340, and/or the like) may identify a service template based on the service, as described above in connection with FIG. 1. In some implementations, the service template may specify a virtual hardware configuration.

As further shown in FIG. 6, process 600 may include determining a version of the service based on the version strategy (block 660). For example, the service deployment manager (e.g., using processor 320, memory 330, storage component 340, and/or the like) may determine a version of the service based on the version strategy, as described above in connection with FIG. 1.

As further shown in FIG. 6, process 600 may include providing, to a service deployment platform, instructions to deploy the service using the virtual hardware configuration and the version (block 670). For example, the service deployment manager (e.g., using processor 320, memory 330, storage component 340, output component 360, communication interface 370, and/or the like) may provide, to a service deployment platform, instructions to deploy the service using the virtual hardware configuration and the version, as described above in connection with FIG. 1.

Process 600 may include additional implementations, such as any single implementation or any combination of implementations described below and/or in connection with one or more other processes described elsewhere herein.

In some implementations, the virtual hardware configuration may include data specifying a number of processors to be used for execution of the service, an amount of memory to be used for execution of the service, an amount of storage to be used for execution of the service, and/or a physical rack to be used for execution of the service. In some implementations, the service deployment platform may receive data identifying, for the service, a number of instances to be deployed, and may provide, to the service deployment platform, data indicating the number of instances to be deployed.

In some implementations, the version strategy may be associated with one of a plurality of version strategies, each of the plurality of version strategies causing determination of service version numbers in a different manner. In some implementations, the instructions to deploy the service may include a link to an image of the service.

In some implementations, the service deployment platform may store data associated with deployment of the service in a log. In some implementations, the log may include one or more timestamps associated with the deployment of the service, data identifying the version strategy, data identifying the service template, data identifying the user account, and/or data identifying the service deployment platform.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, service deployment manager 220 may facilitate the deployment of services in a manner designed to be convenient, secure, and efficient. Convenience may be provided by providing a user interface that enables developers or other users to easily provide information to be used for deploying a service. Security may be provided by using user account verification for various aspects of a deployment, including verification that a user is permitted to deploy a service and verification that the user is permitted to deploy a service in a particular environment, on a particular framework, using a particular virtual hardware configuration, and/or the like. Efficiency may be improved in a variety of ways, including the use of service templates designed to use an appropriate virtual hardware configuration for service deployment. Several different stages of the process for managing service deployment are automated, which may improve speed and efficiency of the process and conserve computing resources (e.g., processor resources, memory resources, and/or the like). Furthermore, implementations described herein use a rigorous, computerized process to perform tasks or roles that were not previously performed. Also, automating the process for managing service deployment conserves computing resources (e.g., processor resources, memory resources, and/or the like) that would otherwise be wasted by using manual investigative processes for attempting to determine whether a user is authorized to deploy a service, which virtual hardware configuration should be used for deploying a particular service, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising: receiving, by a device, a service request, the service request including:
   data identifying a service to be deployed in a cloud computing environment,
   data identifying an execution environment in which the service is to be deployed, and
   data identifying a framework on which the service is to be deployed; identifying, by the device, a service template based on the service,
   the service template specifying a virtual hardware configuration;
   simulating, by the device and based on the service template, deployment of the service;
   obtaining, by the device, information regarding the simulated deployment, the information regarding the simulated deployment comprising at least one of:
   information regarding resources that would be used to deploy the service; or
   information regarding whether a user associated with the service request has permission to deploy the service;
   receiving, by the device and after the simulated deployment, a modified template that includes one or more modifications to the virtual hardware configuration; and deploying, by the device and based on the modified template, the execution environment, and the framework, the service using the virtual hardware configuration.

2. The method of claim 1, wherein receiving the service request comprises:
   receiving the service request via an user interface provided by the device.

3. The method of claim 1, wherein the service request further includes data indicating that the service request is for the simulated deployment.

4. The method of claim 1, further comprising:
   determining whether a user associated with the service request has permission to deploy the service based on stored data that maps permissions with user role information associated with the user.

5. The method of claim 1, wherein the virtual hardware configuration specifies at least one of:
   a number of processors,
   a type of processor,
   an amount of memory,
   a type of memory,
   an amount of data storage,
   a type of data storage,
   a type of network connection,
   a target server,
   a target rack,
   an operating system,
   firmware, or
   software.

6. The method of claim 1, wherein identifying the service template comprises:
   identifying the service template from a plurality of templates associated with the service,
   the service template being identified based on user account information associated with a user associated with the service request.

7. A device, comprising:
   one or more memories; and
   one or more processors, communicatively coupled to the one or more memories, configured to:
   receive a service request,
   the service request including:
   data identifying a service to be deployed in a cloud computing environment,
   data identifying an execution environment in which the service is to be deployed, and
   data identifying a framework on which the service is to be deployed;
   identify a service template based on the service,
   the service template specifying a virtual hardware configuration; simulate, based on the service template, deployment of the service;
   obtain information regarding the simulated deployment, the information regarding the simulated deployment comprising at least one of:
   information regarding resources that would be used to deploy the service, or
   information regarding whether a user associated with the service request has permission to deploy the service;
   receive, after the simulated deployment, a modified template that includes one or more modifications to the virtual hardware configuration; and
   deploy, based on the modified template, the execution environment, and the framework, the service using the virtual hardware configuration.

8. The device of claim 7, wherein the one or more processors, when receiving the service request, are configured to:
   receive the service request via an user interface provided by the device.

9. The device of claim 7, wherein the service request further includes data indicating that the service request is for the simulated deployment.

10. The device of claim 7, wherein the one or more processors are further configured to:
   determine whether a user associated with the service request has permission to deploy the service based on stored data that maps permissions with user role information associated with the user.

11. The device of claim 7, wherein the virtual hardware configuration specifies at least one of:
   a number of processors,
   a type of processor,
   an amount of memory,
   a type of memory,
   an amount of data storage,
   a type of data storage,
   a type of network connection,
   a target server,
   a target rack,
   an operating system,
   firmware, or
   software.

12. The device of claim 7, wherein the one or more processors, when identifying the service template, are configured to:
   identify the service template from a plurality of templates associated with the service,
      the service template being identified based on user account information associated with a user associated with the service request.

13. A non-transitory computer-readable medium storing a set of instructions, the set of instructions comprising:
   one or more instructions that, when executed by one or more processors of a device, cause the device to:
   receive a service request, the service request including:
      data identifying a service to be deployed in a cloud computing environment,
      data identifying an execution environment in which the service is to be deployed, and
      data identifying a framework on which the service is to be deployed;
   identify a service template based on the service,
      the service template specifying a virtual hardware configuration; simulate, based on the service template, deployment of the service;
      obtain information regarding the simulated deployment, the information regarding the simulated deployment comprising at least one of:
   information regarding resources that would be used to deploy the service, or
   information regarding whether a user associated with the service request has permission to deploy the service;
      receive, after the simulated deployment, a modified template that includes one or more modifications to the virtual hardware configuration; and
      deploy, based on the service template, the execution environment, and the framework, the service using the virtual hardware configuration.

14. The non-transitory computer-readable medium of claim 13, wherein the one or more instructions, that cause the device to receive the service request, cause the device to:
   receive the service request via an user interface provided by the device.

15. The non-transitory computer-readable medium of claim 13, wherein the service request further includes data indicating that the service request is for a simulated deployment.

16. The non-transitory computer-readable medium of claim 13, wherein the one or more instructions further cause the device to:
   determine whether a user associated with the service request has permission to deploy the service based on stored data that maps permissions with user role information associated with the user.

17. The non-transitory computer-readable medium of claim 13, wherein the virtual hardware configuration specifies at least one of:
   a number of processors,
   a type of processor,
   an amount of memory,
   a type of memory,
   an amount of data storage,
   a type of data storage,
   a type of network connection,
   a target server,
   a target rack,
   an operating system,
   firmware, or
   software.

18. The non-transitory computer-readable medium of claim 13, wherein the one or more instructions, that cause the device to identify the service template, cause the device to:
   identify the service template from a plurality of templates associated with the service,
      the service template being identified based on user account information associated with a user associated with the service request.

* * * * *